US012689268B2

(12) United States Patent
Bonneau et al.

(10) Patent No.: US 12,689,268 B2
(45) Date of Patent: Jul. 21, 2026

(54) BRUSHLESS ELECTRIC MOTOR WITH OPTIMIZED ELECTRICAL CONNECTIONS

(71) Applicant: Valeo Systemes Thermiques, Le Mesnil-Saint-Denis (FR)

(72) Inventors: David Bonneau, Le Mesnil Saint Denis (FR); Jean-Guy Noufele, Le Mesnil Saint Denis (FR); Olivier Cambronne, Le Mesnil-Saint-Denis (FR)

(73) Assignee: Valeo Systemes Thermiques, La Verriere (FR)

( * ) Notice: Subject to any disclaimer, the term of this patent is extended or adjusted under 35 U.S.C. 154(b) by 495 days.

(21) Appl. No.: 18/266,372

(22) PCT Filed: Oct. 6, 2021

(86) PCT No.: PCT/EP2021/077608
§ 371 (c)(1),
(2) Date: Jun. 9, 2023

(87) PCT Pub. No.: WO2022/122216
PCT Pub. Date: Jun. 16, 2022

(65) Prior Publication Data
US 2024/0039374 A1 Feb. 1, 2024

(30) Foreign Application Priority Data

Dec. 11, 2020 (FR) ...................................... 2013037

(51) Int. Cl.
*H02K 11/33* (2016.01)
*H02K 5/22* (2006.01)
*H02K 7/14* (2006.01)

(52) U.S. Cl.
CPC ............. *H02K 11/33* (2016.01); *H02K 5/225* (2013.01); *H02K 7/14* (2013.01)

(58) Field of Classification Search
CPC .......... H02K 11/33; H02K 5/225; H02K 7/14; H02K 2211/03; H02K 3/522; H02K 5/12; H02K 11/30
See application file for complete search history.

(56) References Cited

U.S. PATENT DOCUMENTS

2023/0006503 A1* 1/2023 Mellere .................... H02K 5/10

FOREIGN PATENT DOCUMENTS

| CN | 102834977 B | 6/2015 | |
| CN | 110945762 A | 3/2020 | |
| DE | 10113559 A1 | 9/2001 | |
| DE | 202005010252 U1 * | 11/2006 | ............. H02K 11/33 |

(Continued)

OTHER PUBLICATIONS

International Search Report and Written Opinion in corresponding International Application No. PCT/EP2021/077608, dated Nov. 4, 2021 (14 pages).

(Continued)

*Primary Examiner* — Mohamad A Musleh
(74) *Attorney, Agent, or Firm* — Osha Bergman Watanabe & Burton LLP

(57) ABSTRACT
The present invention relates to a brushless electric motor for rotating a fan of a motor-driven ventilation unit of a vehicle, the motor comprising a rotor, a stator equipped with at least two coils, a casing housing a power circuit (15) and a servo circuit (13) for controlling the power circuit.

9 Claims, 3 Drawing Sheets

(56) References Cited

FOREIGN PATENT DOCUMENTS

| | | | | |
|---|---|---|---|---|
| DE | 102013020094 | B4 | 6/2015 | |
| DE | 202015105246 | U1 | 1/2017 | |
| DE | 102015217020 | A1 | 3/2017 | |
| DE | 102016124972 | A1 * | 7/2017 | .............. H02K 3/50 |
| EP | 1384307 | B1 | 3/2019 | |
| FR | 3069394 | A1 | 1/2019 | |
| FR | 3089715 | A1 | 6/2020 | |
| KR | 20130106364 | A * | 9/2013 | .............. H02K 5/18 |

OTHER PUBLICATIONS

Office Action issued in corresponding European Application No. 21782574.4, dated Feb. 17, 2026. (8 pages).

* cited by examiner

[fig1]
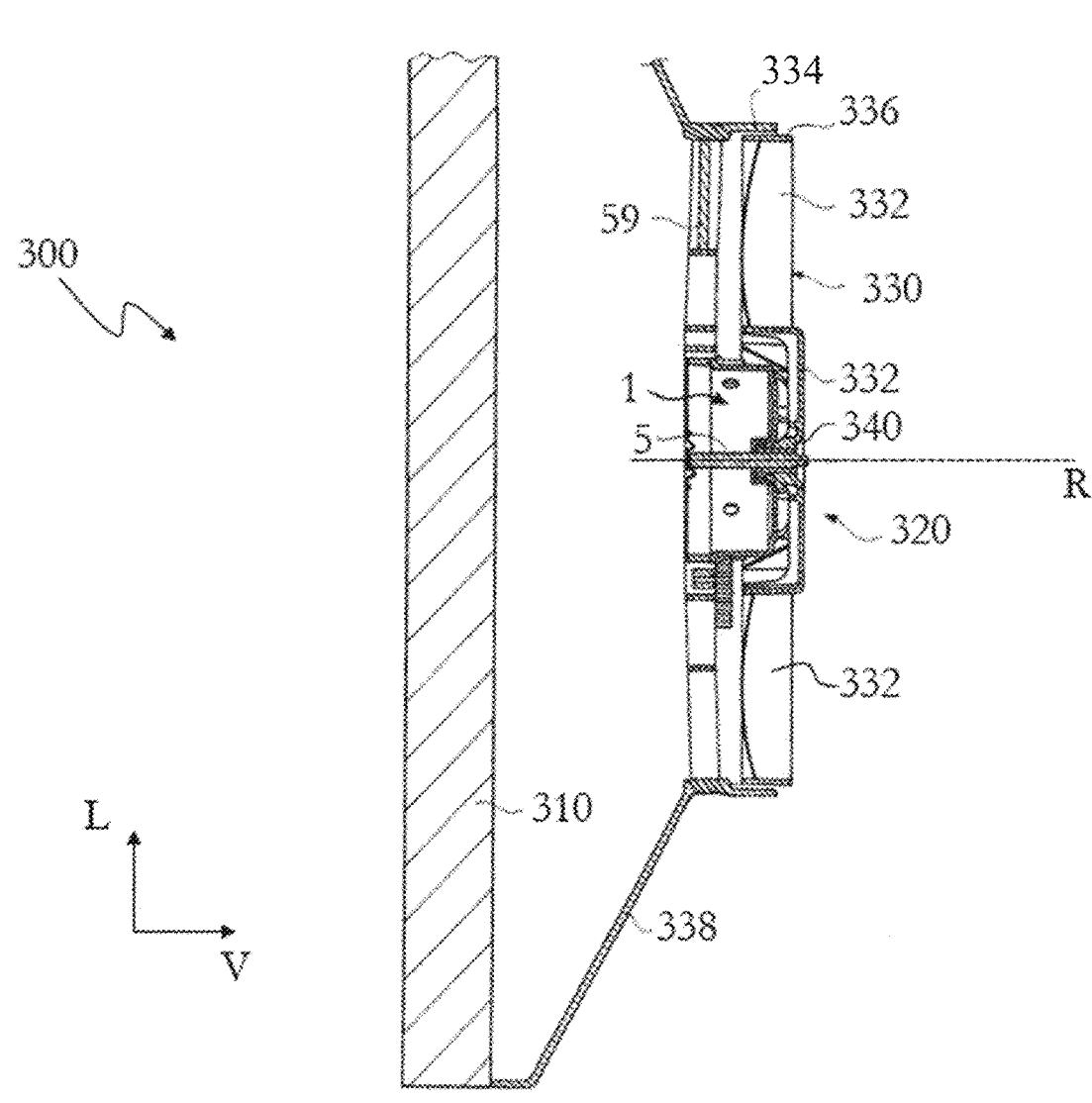

[fig 2]
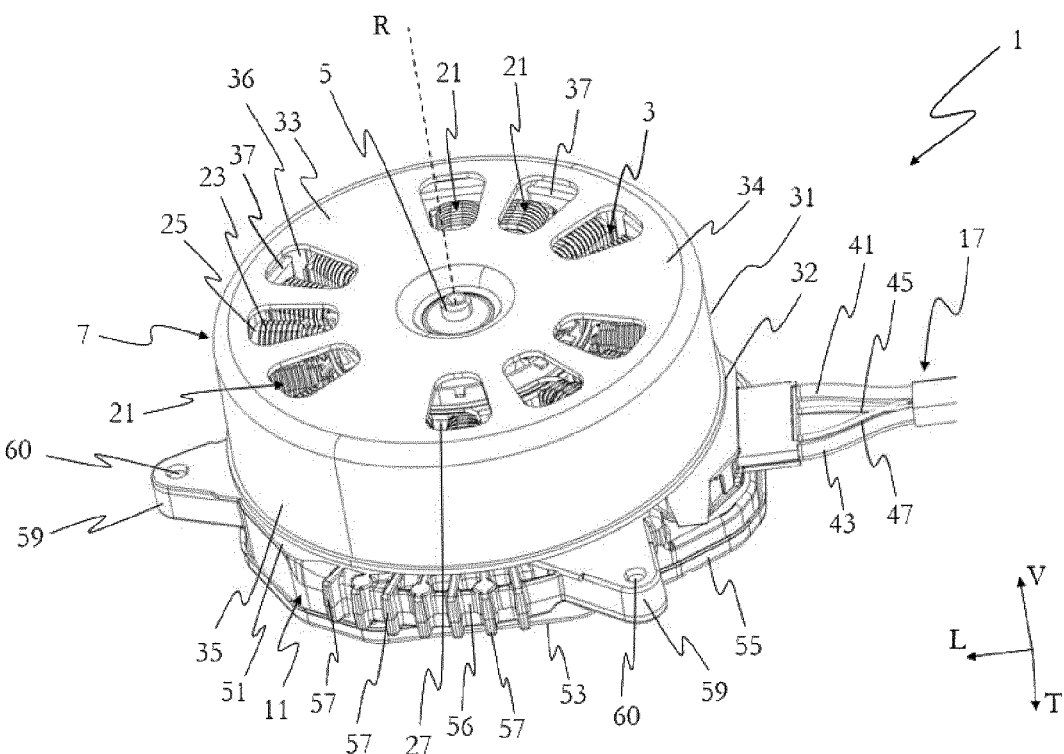
[fig 3]
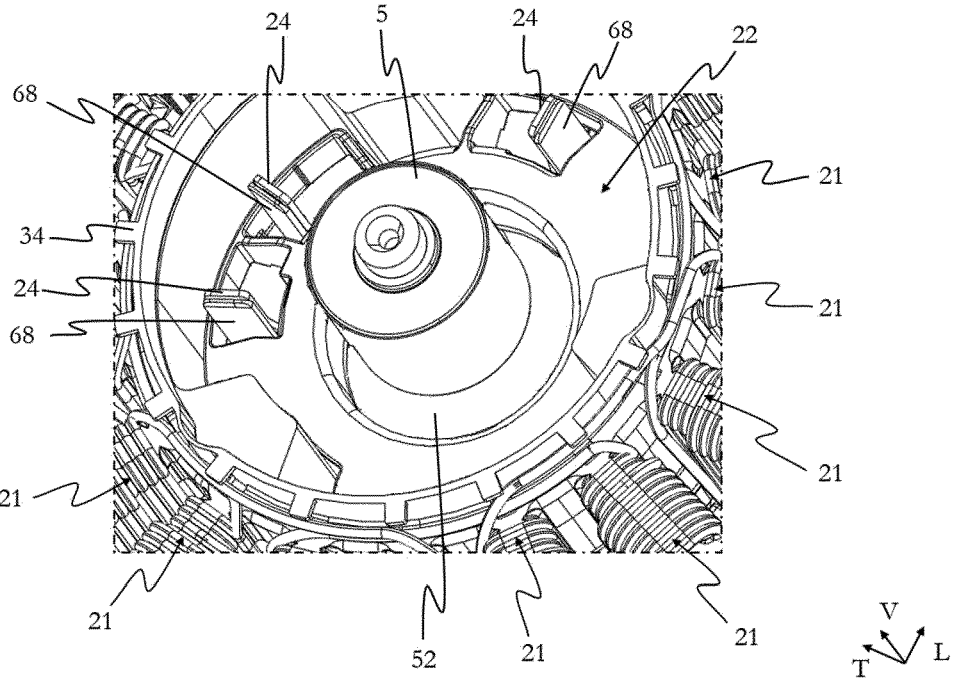

[fig 4]
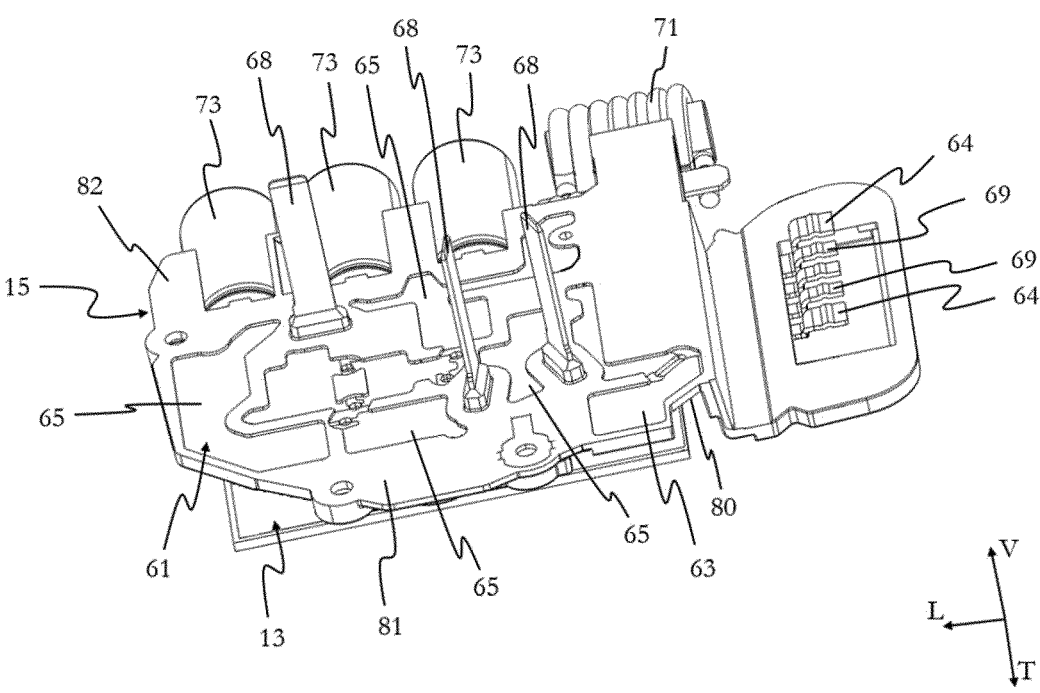
[fig 5]
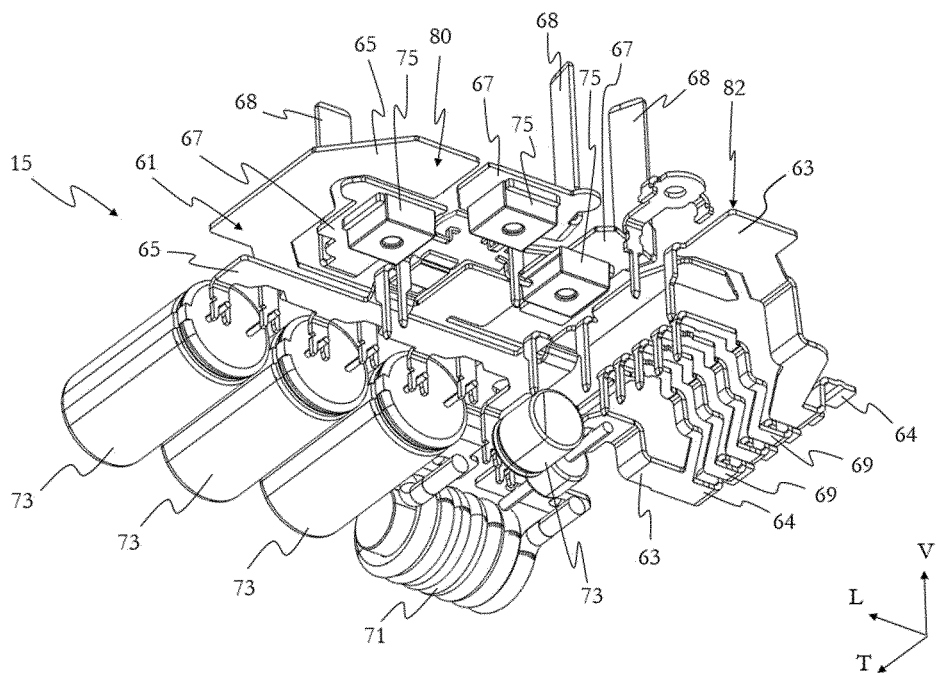

BRUSHLESS ELECTRIC MOTOR WITH OPTIMIZED ELECTRICAL CONNECTIONS

The present invention relates to the field of vehicle heat treatment modules. More particularly, the invention relates to brushless electric motors and to heat treatment module motor-fan units equipped with brushless electric motors.

A brushless electric motor for a motor-fan unit generally comprises a rotor and a stator surmounting an electronic box. This electronic box usually comprises two shells forming a housing for electronic circuits, such as for example a power circuit and/or a control circuit. The electronic circuits make it possible, on the one hand, to electrically supply the stator and/or the rotor from an electrical power supply of the vehicle in which the motor-fan unit is used. These electronic circuits make it possible, on the other hand, to control the operating parameters of the brushless electric motor.

Owing to the current levels used, busbars are used for wiring between the electrical power supply of the vehicle and the electronic circuits or between the electronic circuits and the stator of the brushless electric motor. These flat busbars dissipate greater power compared with cables owing to their larger exchange surface and their thinner, or even absent, insulation sheathing. They allow a reduction of the skin effect where an alternating current is present. They are well suited to making short connections, which is very favorable to the reduction of stray inductances and therefore to the notable reduction of switching overvoltages. Given their size and their geometry, busbars are easily machined and standardized.

However, the busbars need to be welded to two other parts. For example, a busbar is welded to the electronic circuits and to the stator. This adds steps to the assembly method. Material costs and welding costs are therefore much higher. In addition, these are as many welding points that can yield and reduce reliability.

The object of the present invention is to overcome at least one of the aforementioned drawbacks and also to lead to other advantages by proposing a new brushless electric motor intended to rotate a propeller of a motor-fan unit of a heat treatment module of at least one heat exchanger of a vehicle.

The present invention proposes a brushless electric motor intended to rotate a propeller of a motor-fan unit of a heat treatment module of at least one heat exchanger of a vehicle. The brushless electric motor comprises a rotor, a stator equipped with at least two coils, a box housing a power circuit and a servo circuit for controlling the power circuit. The power circuit comprises at least one electrically conductive track intended to supply an electric current from an electrical power supply of the vehicle to the stator, the electrically conductive track comprising at least a first portion of which one end is welded directly to an electrical conduction device intended to transport the electric current from the electrical power supply of the vehicle and at least a second portion of which one end is directly connected to the stator, the power circuit comprising a support for the electrically conductive track, the support being molded on at least part of the electrically conductive track.

The brushless electric motor therefore comprises a power circuit welded directly to the electrical conduction device. There is therefore no longer any busbar to make the electrical connection between the electrical conduction device and the power circuit. Thus, the number of welds to be made to establish the electrical connection between these two elements is reduced, which makes it possible to reduce material costs. In addition, the power circuit is directly connected to the stator, so there is no longer any busbar to ensure the connection between these two elements. Here too, the number of welds is therefore reduced as well as the material costs. The reliability of the connections is therefore improved.

According to one embodiment, the support is molded at least partly on the first portion of the electrically conductive track and at least partly on the second portion of the electrically conductive track.

According to one embodiment, the support comprises a dielectric material. This makes it possible to prevent short circuits.

According to one embodiment, the electrically conductive track has the shape of a bar with a rectangular cross section.

According to one embodiment, the electrically conductive track has a cross section greater than or equal to 4 mm$^2$ as seen in a plane perpendicular to a general direction of extension of the electrically conductive track.

According to one embodiment, the power circuit comprises at least one inverter configured to convert the direct electric current from the power supply of the vehicle into an alternating electric current delivered to the coils of the stator.

According to one embodiment, the inverter is positioned in the electronic box.

According to one embodiment, the inverter comprises at least one transistor, preferably an insulated gate field effect transistor (MOSFET, acronym for Metal Oxide Semiconductor Field Effect Transistor).

According to one embodiment, the power circuit comprises at least one switch configured to manage the passage of the current between the first portion of the electrically conductive track and the second portion of the electrically conductive track.

According to one embodiment, the switch comprises at least one transistor, preferably an insulated gate field effect transistor (MOSFET, acronym for Metal Oxide Semiconductor Field Effect Transistor).

According to one embodiment, the switch is carried by part of the second portion of the electrically conductive track.

According to one embodiment, the switch is arranged on a first face of the power circuit and the end of the second portion of the electrically conductive track emerges from a second face of the power circuit, the second face being opposite the first face.

According to one embodiment, the electrical connection between the end of the first portion and the electrical conduction device is arranged on the same side of the support as the electrical connection between the end of the second portion and the coils of the stator.

According to one embodiment, the end of the second portion of the electrically conductive track extends substantially perpendicularly, preferably strictly perpendicularly, to an extension plane of the second face.

Here, and throughout the following text, the term "substantially" should be understood to mean that manufacturing tolerances, and any assembly tolerances, need to be taken into account.

According to one embodiment, the end of the second portion of the electrically conductive track has the shape of a straight blade. This shape can be observed in projection in a plane parallel to the extension plane of the second face.

According to one embodiment, part of the end of the second portion of the electrically conductive track passes through the box.

According to one embodiment, part of the end of the second portion of the electrically conductive track emerges from the box and projects into a cavity surrounded by the coils of the stator.

According to one embodiment, the electrical conduction device comprises at least one bundle of electrical cables.

According to one embodiment, the bundle of electrical cables comprises two cables configured to carry the electric current from the electrical power supply of the vehicle to the power circuit and two servo cables to connect the servo circuit to the vehicle and whose function is to transmit signals from the vehicle to the electric motor or from the electric motor to the vehicle.

According to one embodiment, the invention proposes a motor-fan unit of a heat treatment module of at least one heat exchanger of a vehicle, comprising a propeller and at least one brushless electric motor according to the invention, the brushless electric motor being connected to the propeller by a shaft and being configured to drive the propeller in rotation.

According to one embodiment, the invention provides a heat treatment module of a vehicle, comprising at least one heat exchanger and at least one brushless electric motor according to the invention or at least one motor-fan unit according to the invention.

Further features and advantages of the invention will become more clearly apparent both from the following description and from a number of exemplary embodiments, which are given by way of nonlimiting indication with reference to the attached schematic drawings, in which:

FIG. 1 is a schematic sectional view of a heat treatment module comprising a motor-fan unit according to the invention;

FIG. 2 is a schematic perspective view of a brushless electric motor according to the invention in the assembled configuration as shown in FIG. 1;

FIG. 3 is a schematic perspective view of part of a stator of the brushless electric motor of FIG. 2 without rotor;

FIG. 4 is a schematic perspective view of a power circuit according to the invention;

FIG. 5 is a schematic perspective view of the power circuit of FIG. 4 from another angle of view and without support.

It should first of all be noted that, although the figures set out the invention in detail for the implementation thereof, they may of course be used to better define the invention, where appropriate. It should also be noted that, in all of the figures, elements that are similar and/or perform the same function are indicated using the same numbering.

In the following description, a direction of a longitudinal axis L, a direction of a transverse axis T, and a direction of a vertical axis V are represented by a trihedron (L, T, V) in the figures. A horizontal plane is defined as being a plane perpendicular to the vertical axis V, a longitudinal plane is defined as being a plane perpendicular to the transverse axis T, and a transverse plane is defined as being a plane perpendicular to the longitudinal axis L.

With reference to FIG. 1, the heat treatment module 300 shown in FIG. 1 comprises a heat exchanger 310 which forms part of the cooling circuit of a combustion engine and a motor-fan unit 320 to ensure a forced circulation of an air flow F through the heat exchanger 310.

The heat exchanger 310 comprises, in a conventional manner, a bundle of tubes through which a cooling fluid passes, such as an aqueous solution of ethylene glycol. It is crossed by the air flow F perpendicular to the bundle of tubes. The engine of the vehicle is cooled by a heat exchange between the flow of air passing through the bundle and the fluid in the cooling circuit.

The motor-fan unit 320 is placed facing the radiator bundle. The motor-fan unit 320 comprises a propeller 330 driven in rotation by a brushless electric motor 1. The brushless electric motor 1 is fixed on a fairing 338 connected to a periphery of the heat exchanger 310.

The propeller 330 consists of a plurality of blades 332 mounted on a bowl 334 and surrounded by a circular fairing 336 itself housed inside the fairing 338. The bowl 334 of the propeller 330 is secured to a shaft 5 of the brushless electric motor 1 on which it is fixed by means of a central nut 340. The brushless electric motor 1 is connected to the fairing 338 by fixing lugs 59.

With reference to FIG. 1 and to FIG. 2, the brushless electric motor 1 comprises a box 11, a stator 3 surmounting the box 11 and a rotor 7 provided with a shaft 5 and rotatably mounted about an axis of rotation R. The axis of rotation R is parallel to the vertical axis V as defined above. The axis of rotation R is for example parallel to a longitudinal axis of the vehicle when the heat module is mounted on the vehicle. The stator 3 is fixed relative to the box 11. The rotor 7 is free to rotate relative to the stator 3.

In the embodiment illustrated in FIG. 2, the stator 3 is mounted fixed on an outer face 52 of an upper wall 51 of the box 11. The stator 3 extends in a general extension plane parallel to the previously defined horizontal plane. The shaft 5 extends along an extension axis perpendicular to the general extension plane of the stator 3. In other words, the shaft 5 extends along the vertical axis V from the main extension plane of the stator 3 to the rotor 7.

The stator 3 comprises a plurality of coils 21, for example produced by winding one or more metal wires 23 around teeth 25 of a body 27 of the stator 3. The coils 21 are uniformly arranged in a circle around the shaft 5 as seen in projection in the horizontal plane. As illustrated in FIG. 3, the coils 21 and an upper wall 51 of the box delimit a cavity 22 in which electrical connectors 24 of the stator 3 are housed to supply the coils 21 with an electric current from an electrical power supply of the vehicle (not shown).

The rotor 7 is mounted fixed on the shaft 5. The axis of rotation R of the rotor 7 coincides with the extension axis of the shaft 5. The rotor 7 comprises a bell 31 of cylindrical shape with a circular base, a longitudinal axis of which substantially coincides with the axis of rotation R. The bell 31 forms a Faraday cage around the stator 3. The bell 31 is open at a first longitudinal end 32 and closed by an upper partition 34 at a second longitudinal end 33. The bell 31 is delimited radially by a peripheral partition 35. A housing 36 is delimited by the peripheral partition 35 and the upper partition 34. The housing 36 accommodates at least part of the stator 3, that is to say, in the example shown in FIG. 2, the coils 21. In other words, the peripheral partition 35 of the rotor 7 surrounds the coils 21 of the stator 3.

As shown in FIG. 2, the rotor 7 comprises a plurality of permanent magnets 37. The permanent magnets 37 are arranged in the housing 36. The permanent magnets 37 are uniformly distributed on an internal face of the peripheral partition 35 as seen in projection in the horizontal plane. The permanent magnets 37 are magnetic poles which tend to follow the rotating magnetic field generated by the coils 21 of the stator 3 and then allow the rotor 7 to rotate.

With reference to FIG. 2 and to FIG. 4, the box 11 of the brushless electric motor 1 delimits an interior volume in which are housed a servo circuit 13 and a power circuit 15. The box 11 is closed and sealed.

The power circuit 15 is configured to electrically connect an electrical conduction device 17 to the coils 21 from the electrical power supply of the vehicle. The power circuit 15 will be described in more detail below. The electrical connection between the power circuit 15 and the coils is placed under the control of the servo circuit 13.

With reference to FIG. 1, the electrical power supply of the vehicle is routed to the power circuit 15 by the electrical conduction device 17. The electrical conduction device 17 comprises a bundle of electrical cables comprising at least two power cables 41, 43 configured to convey the electric current from the electrical power supply of the vehicle to the power circuit 15, and two servo cables 45, 47 to connect the servo circuit 13 to the vehicle. The two servo cables 45, 47 have the function of transmitting signals from the vehicle to the brushless electric motor 1 and/or from the brushless electric motor 1 to the vehicle. The transmitted signals may for example concern the setting in operation (on/off) of the brushless electric motor 1 and/or an operating setpoint of the brushless electric motor 1 and/or a diagnosis of the state of the brushless electric motor 1.

It should be understood here, as well as in all that follows, that "electrical cable" means one or more flexible electrically conductive element(s) surrounded by at least one electrically insulating layer.

With reference to FIG. 2, the box 11 further comprises a lower wall 53 connected to the upper wall 51 by a vertical wall 55. The upper wall 51, the lower wall 53 and the vertical wall 55 delimit the interior volume. The upper wall 51 and the lower wall 53 extend parallel to the horizontal plane as previously defined. The vertical wall 55 extends circumferentially from an edge of the upper wall 41 toward an edge of the lower wall 53, parallel to the vertical axis V.

The box 11 is composed of at least one heat-conducting material which allows it to be a heat sink. This makes it possible in particular to dissipate the heat produced by the stator 3, the rotor 7, the power circuit 15 and/or the servo circuit 13 when the brushless electric motor 1 is in operation. The heat-conducting material is chosen from among aluminum, copper, a heat-conducting polymer and a mixture thereof.

The box 11 comprises fins 57. A first part of the fins projects from an outer face 52 of the upper wall 51 and a second part of the fins 57 projects from an outer face 56 of the vertical wall 55. The fins make it possible to improve heat exchange between the box 11 and the air outside the box 11. The fins of the first part of the fins 57 are integral with the upper wall 51 of the box 11. The fins of the second part of the fins 57 are integral with the vertical wall 55 of the box 11.

The material or materials making up the box 11 are also sufficiently electrically conductive to absorb at least in part the electromagnetic fields emitted by the power circuit 15 and/or the servo circuit 13. The electronic components of the vehicle are thus protected from the electromagnetic fields generated by the power circuit 15 and/or the servo circuit 13.

With reference to FIG. 2, the box comprises fixing lugs 59 for fixing the motor-fan unit 320 on the heat treatment module 300. Each fixing lug 59 extends from the outer face 56 of the vertical wall 55 of the box 11 in a general extension plane perpendicular to the axis of rotation R. Each fixing lug 59 comprises a through passage 60 which extends along an axis parallel to the axis of rotation R. The through passages 60 are configured to cooperate with fixing elements (not shown) of the heat treatment module 300. The fixing elements are for example screws.

With reference to FIG. 4, the power circuit 15 extends in a general extension plane perpendicular to the axis of rotation R of the rotor 7 with a first face 80, and a second face 82, opposite the first face 80. The servo circuit 13 is fixed on the first face 80 of the power circuit 15. The power circuit 15 is fixed on the box 11 on an inner face 50 of the upper wall 51 of the box 11. Thus, the second face 82 of the power circuit 15 faces the inner face 50 of the upper wall 51 of the box 11. In other words, the power circuit 15 is inserted between the servo circuit 13 and the upper wall 51 of the box 11, along the axis of rotation R.

The power circuit 15 comprises at least one electrically conductive track 61 and at least one support 81 for the electrically conductive track 61.

The electrically conductive track 61 comprises at least a first portion 63 and at least a second portion 67 electrically connected to the first portion by a plurality of intermediate portions 65. The portions 63, 65, 67 of the electrically conductive track 61 each have the shape of a bar with a rectangular cross section as seen in projection in a plane perpendicular to a main direction of conduction of the current. Each portion 63, 65, 67 of the electrically conductive track 61 has a cross section greater than or equal to 4 mm$^2$ as seen in projection in a plane perpendicular to the main direction of conduction of the current.

With reference to FIG. 4 and to FIG. 5, the electrically conductive track 61 comprises two first portions 63 each having one end 64 welded directly to the power cables 41, 43 of the electrical conduction device 17. There is therefore no longer any busbar to make the electrical connection between the electrical conduction device 17 and the power circuit 15. Thus, the number of welds to be made to establish the electrical connection between these two elements is halved, which makes it possible to reduce material costs. The reliability of the connections is therefore improved.

Each end 64 of each first portion 63 has an S-shaped profile as seen in projection in the longitudinal plane as defined above.

The electrically conductive track 61 comprises three second portions 67 which each have one end 68 welded to the electrical connectors 24 of the stator 3. In other words, each end 68 of each second portion 67 is welded to an electrical connector 24 of the stator 3. Each end 68 of the second portions 67 is therefore in direct electrical contact with an electrical connector 24 of the stator 3. Each end 68 of the second portions 67 is also in direct mechanical contact with an electrical connector 24 of the stator 3. The power circuit 15 is therefore directly connected to the stator 3; there is therefore no longer any busbar to ensure the connection between these two elements. Here too, the number of welds is halved and material costs are reduced. The reliability of the connections is then improved.

The support 81 is a molding on at least part of the electrically conductive track 61. In other words, the support 81 at least partly molds the first portion 63, the intermediate portions 65 and the second portion 67. The first portions 63, the intermediate portions 65 and the second portions 67 therefore have parts not covered by the support, such as for example the ends 64 of the first portions 63 and the ends 68 of the second portions 67.

The support 81 is composed of at least one synthetic material. The synthetic material may be a dielectric material so as to avoid short circuits. The synthetic material is chosen from the group comprising a PPS, a PPT and a mixture thereof, regardless of the percentage of glass fiber added.

With reference to FIG. 4 and to FIG. 5, the ends 68 of the second portions 67 develop from the second face 82 of the power circuit 15 in the direction of the stator 3 in a plane containing the axis of rotation R of the rotor 7. The ends 68 of the second portions 67 therefore extend perpendicularly with respect to the general extension plane of the power circuit 15. The ends 68 of the second portions 67 have a blade-shaped profile as seen in projection in a plane perpendicular to the axis of rotation R of the rotor 7. The ends 68 of the second portions 67 are arranged on the side opposite the servo circuit 13 with respect to the support 81 for the electrically conductive track 61.

The electrical connections between the ends 68 of the second portions 67 and the electrical connectors of the stator 3 and the electrical connections between the ends 64 of the first portions 63 with the power cables 41, 43 of the electrical conduction device 17 are arranged on the opposite side to the servo circuit 13 relative to the main extension plane of the power circuit 15. In other words, the electrical connection of the ends 68 of the second portions 67 to the electrical connectors 24 of the stator 3 and the electrical connection of the ends 64 of the first portions to the power cables 41, 43 of the electrical conduction device 17 are arranged on the second face 82 of the power circuit 15. In other words, the electrical connections of the ends 68 of the second portions 67 to the electrical connectors 24 of the stator 3 and the electrical connections of the ends 64 of the first portions 63 to the power cables 41, 43 of the electrical conduction device 17 are arranged on the same side of the support 81.

With reference to FIG. 3, when the brushless electric motor 1 is in the assembled configuration, the ends 68 of the second portions 67 of the electrically conductive track 61 pass through the upper wall 41 of the box 11 at openings (not visible) and extend at least partly into the cavity 22. In other words, part of the ends 68 of the second portions 67 passes through the box 11 and emerges from the box 11 to project into the cavity 22. The electrical connection by welding with the electrical connectors 24 of the stator 3 is inside the cavity 22. Each opening is provided with a seal to ensure the tightness of the box against water, humidity and foreign bodies. Thus, no electrical connection between the stator 3 and the power circuit 15 is made within the box 11.

With reference to FIG. 4 and to FIG. 5, the power circuit 15 comprises a plurality of electrical components 71, 73, 75, 77. The plurality of electrical components comprises at least one self-inductor 71, at least one capacitor 73, and at least one switch 75, and at least one inverter 77.

As shown in FIG. 5, the power circuit 15 comprises three switches 75 arranged on the first face 80 of the power circuit 15. Each switch 75 is carried by part of the second portions 67 of the electrically conductive track 61. In other words, the switches 75 are arranged on the face opposite the second face 82 from which emerge the ends 68 of the second portions 67 of the electrically conductive track 61. The switches 75 are therefore not carried by the ends 68 of the second portions 67 of the electrically conductive track 61.

The switches 75 are configured to manage the passage of current between the first portion 63 of the electrically conductive track 61 and the second portion 67 of the electrically conductive track 61. Each switch 75 comprises at least one transistor, preferably an insulated gate field effect transistor also called MOSFET, acronym for Metal Oxide Semiconductor Field Effect Transistor.

The inverter 77 is configured to convert the direct current supplied by the electrical power supply of the vehicle into an alternating electric current so as to generate a rotating magnetic field in the stator 3 and therefore to rotate the rotor 7. The inverter 77 comprises at least one transistor, preferably an insulated gate field effect transistor also called MOSFET, acronym for Metal Oxide Semiconductor Field Effect Transistor.

With reference to FIG. 4, the servo circuit 13 comprises electrical connectors 69 with the servo cables 45, 47 of the electrical conduction device 17. In other words, the electrical connectors 69 connect the servo cables 45, 47 to the servo circuit. Each electrical connector 69 is for example welded to one end of one of the cables 45, 47. The electrical connectors 69 are molded with the power circuit 15. The electrical connectors 69 are arranged on the same side as the ends 64 of the first portions 63 of the electrically conductive track 61.

Of course, the invention is not limited to the examples that have just been described, and numerous modifications may be made to these examples without departing from the scope of the invention.

The invention claimed is:

1. A brushless electric motor configured to rotate a propeller of a motor-fan unit of a vehicle, comprising:
   a rotor;
   a stator equipped with at least two coils;
   a box housing a power circuit; and
   a servo circuit for controlling the power circuit, wherein the power circuit comprises at least one electrically conductive track configured to supply an electric current from an electrical power supply of the vehicle to the stator,
   the electrically conductive track comprising at least a first portion of which one end is welded directly to an electrical conduction device configured to transport the electric current from the electrical power supply of the vehicle and at least a second portion of which one end is directly connected to the stator, and
   the power circuit comprising a support for the electrically conductive track, the support being molded on at least part of the electrically conductive track,
   wherein part of the end of the second portion of the electrically conductive track passes through the box.

2. The brushless electric motor as claimed in claim 1, wherein the electrically conductive track has the shape of a bar with a rectangular cross section.

3. The brushless electric motor as claimed in claim 1, wherein the power circuit comprises at least one switch configured to manage the passage of the current between the first portion of the electrically conductive track and the second portion of the electrically conductive track.

4. The brushless electric motor as claimed in claim 3, wherein the switch is carried by part of the second portion of the electrically conductive track.

5. The brushless electric motor as claimed in claim 3, wherein the switch is arranged on a first face of the power circuit and the end of the second portion of the electrically conductive track emerges from a second face of the power circuit, the second face being opposite the first face.

6. The brushless electric motor as claimed in claim 5, wherein the end of the second portion of the electrically conductive track extends substantially perpendicularly to an extension plane of the second face.

7. The brushless electric motor as claimed in claim 1, wherein the electrical connection between the end of the first portion and the electrical conduction device is arranged on the same side of the support as the electrical connection between the end of the second portion and the coils of the stator.

8. The brushless electric motor as claimed in claim 1, wherein part of the end of the second portion of the electrically conductive track emerges from the box and projects into a cavity surrounded by the coils of the stator.

9. A motor-fan unit of a heat treatment module of a vehicle, comprising: a propeller and at least one brushless electric motor as claimed in claim 1, the brushless electric motor being connected to the propeller by a shaft and being configured to drive the propeller in rotation.

\* \* \* \* \*